United States Patent [19]

Le Brise

[11] 4,132,103

[45] Jan. 2, 1979

[54] METHOD OF PRODUCING AN ANNULAR PART FOR USE AS A DIAPHRAGM

[75] Inventor: Raymond Le Brise, Montmorency, France

[73] Assignee: Societe Anonyme Francaise du Ferodo, Paris, France

[21] Appl. No.: 821,496

[22] Filed: Aug. 3, 1977

[30] Foreign Application Priority Data

Aug. 9, 1976 [FR] France .................. 76 24247

[51] Int. Cl.² .............................................. B21D 28/00
[52] U.S. Cl. .......................................... 72/326; 83/36; 83/39; 113/116 V
[58] Field of Search .................. 83/34, 35, 36, 39, 40, 83/41, 176; 72/326, 331, 324; 113/116 V, 116 BB; 29/173; 267/159, 160, 161

[56] References Cited

U.S. PATENT DOCUMENTS

| | | | |
|---|---|---|---|
| 3,235,049 | 2/1966 | Hufstader | 167/161 |
| 3,416,211 | 12/1968 | Ahlman | 83/36 |

Primary Examiner—Lowell A. Larson
Attorney, Agent, or Firm—Charles E. Brown

[57] ABSTRACT

The invention relates to annular diaphragms for example for use in clutches, comprising a peripheral portion forming a Belleville washer and a central portion fragmented by slots into radial segments. By means of the method according to the invention, in order to obtain a reduced width for the open end of the slots, the two edges of the slots are produced in two separate operations, namely a first cutting operation in the course of which one of these edges is first formed and then a second cutting operation in the course of which the other edge is formed.

35 Claims, 59 Drawing Figures

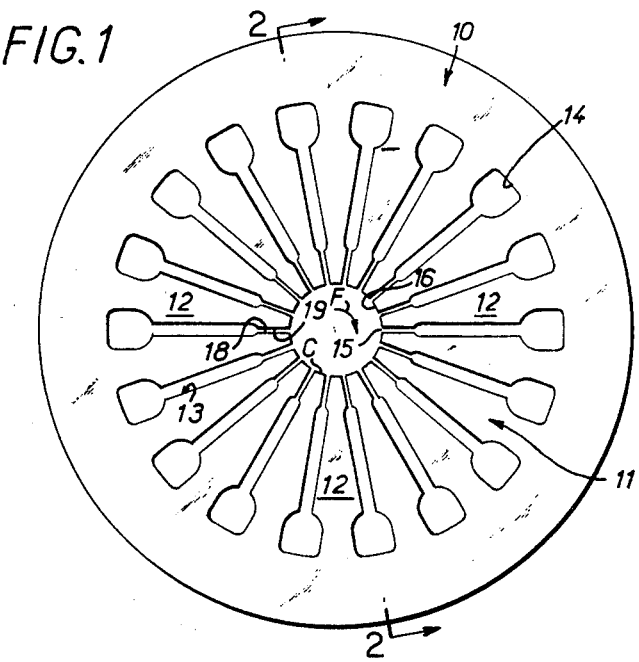
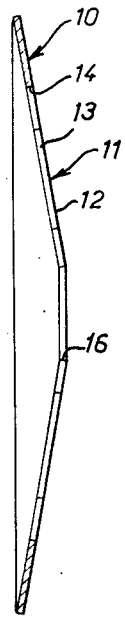
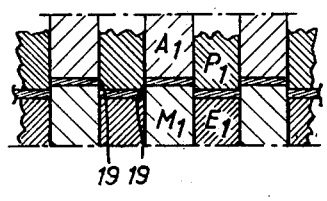
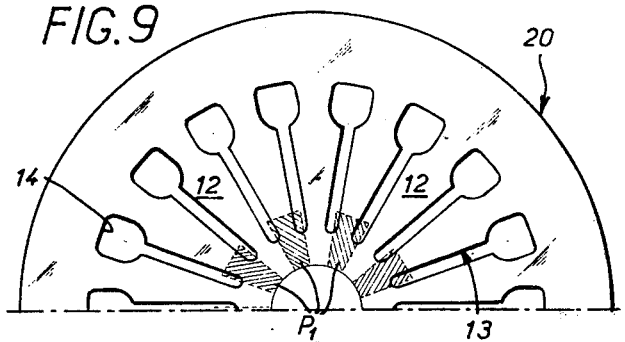
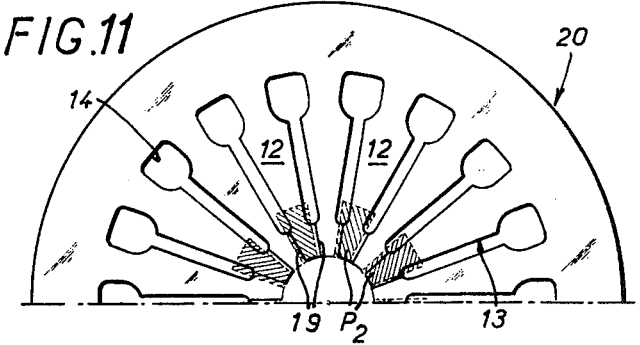
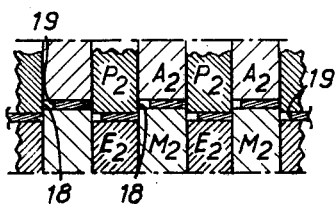
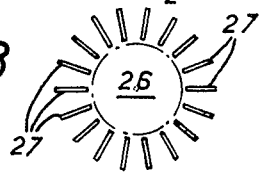

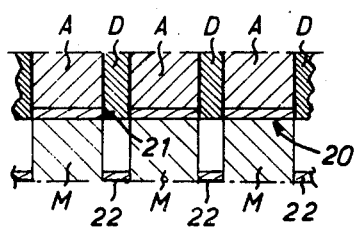
FIG.3
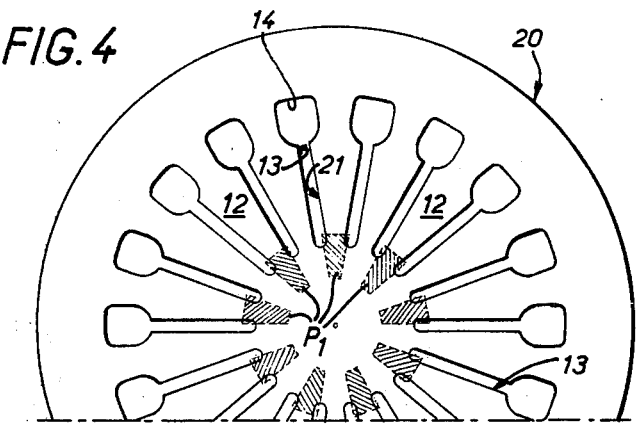
FIG.4
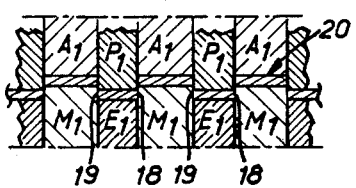
FIG.5
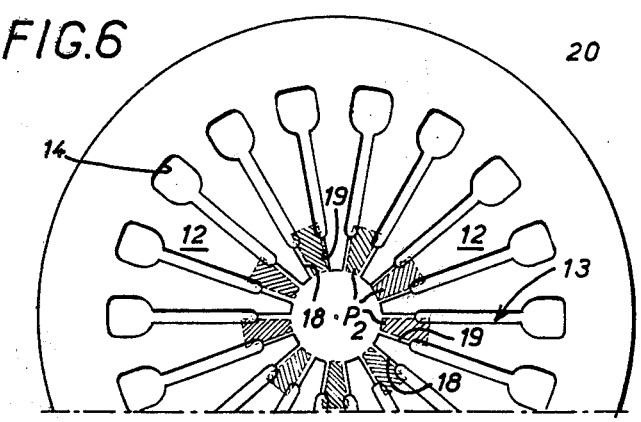
FIG.6
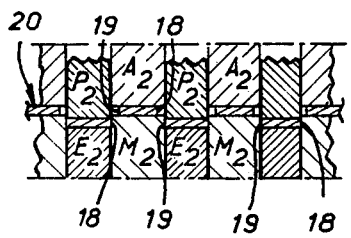
FIG.7
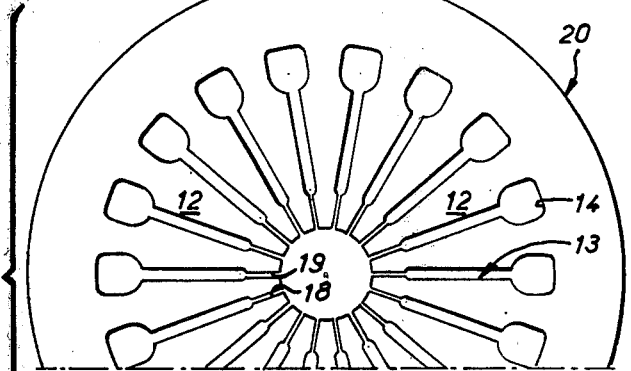
FIG.8
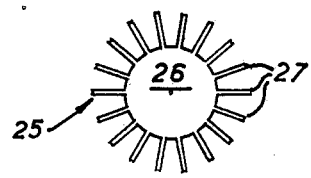

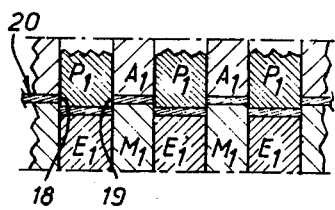
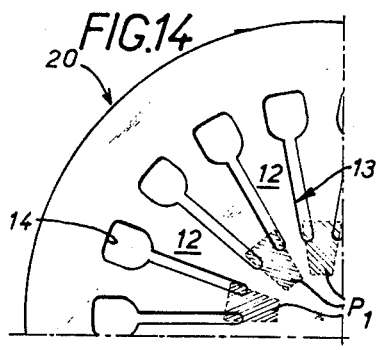
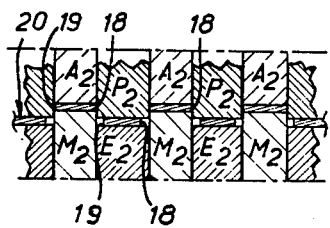
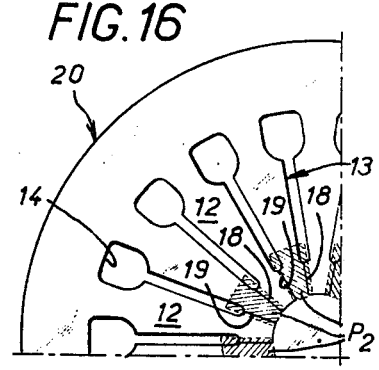
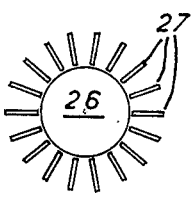
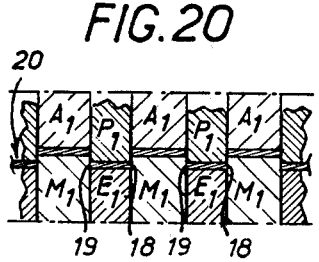
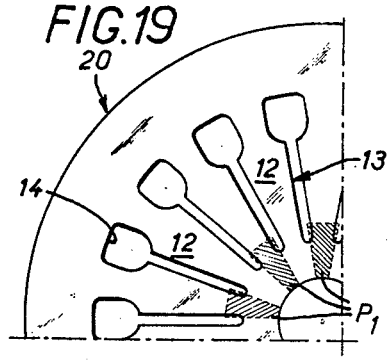
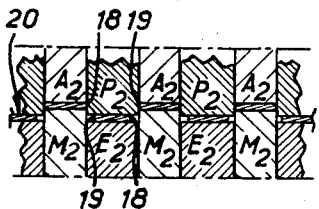
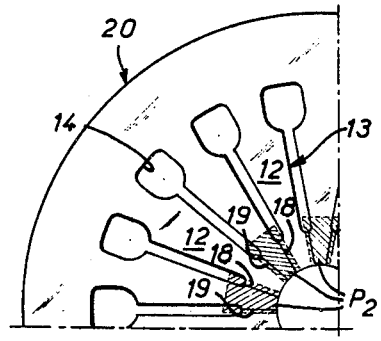

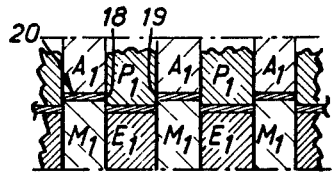
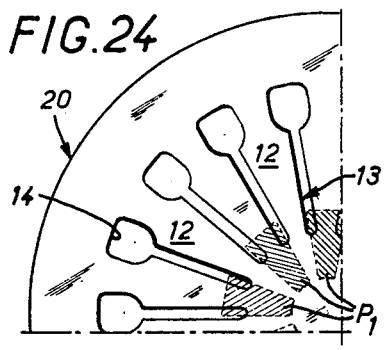
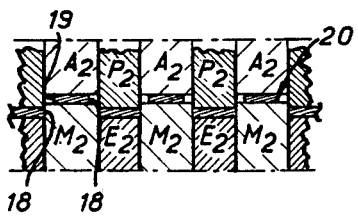
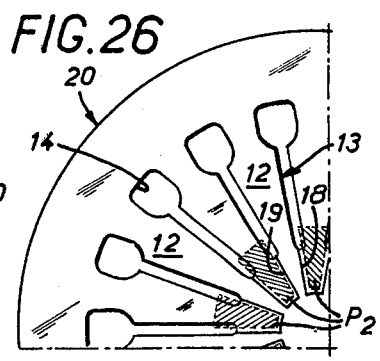
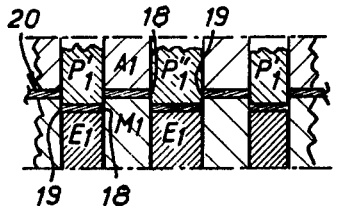
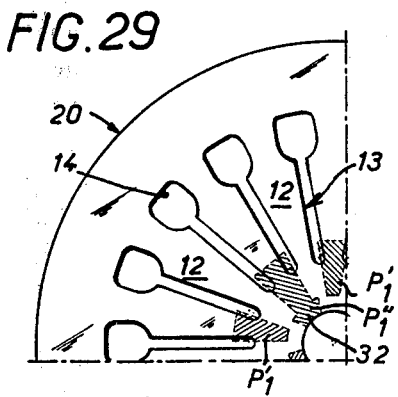
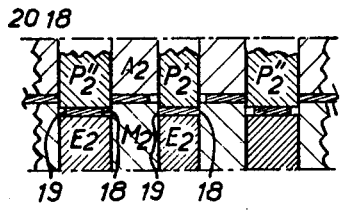
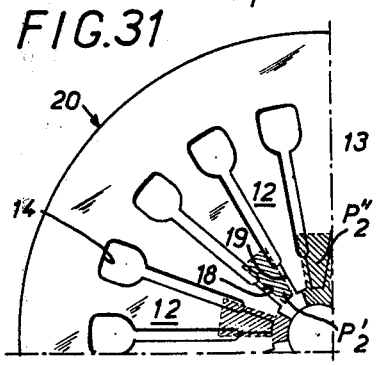

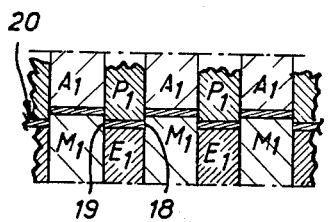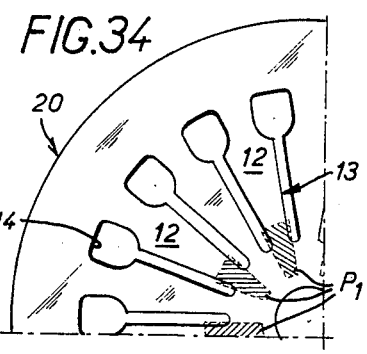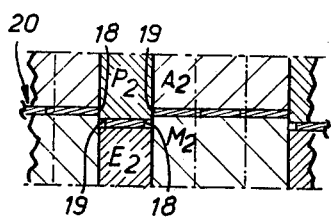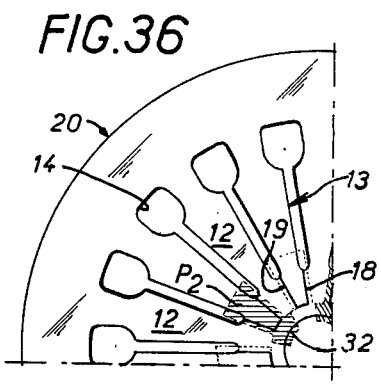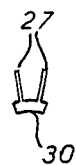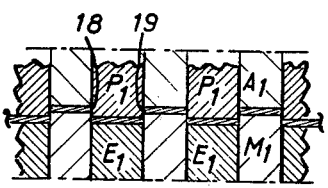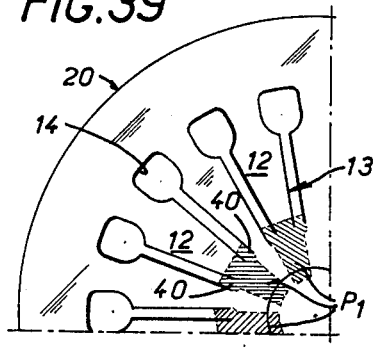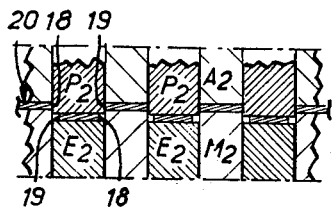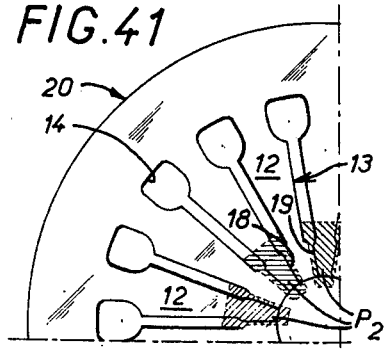

METHOD OF PRODUCING AN ANNULAR PART FOR USE AS A DIAPHRAGM

BACKGROUND OF THE INVENTION

The present invention relates generally to annular parts of the type commonly referred to as diaphragms, used mainly in clutches and particularly in diaphragm clutches for motor vehicles.

As is known, an annular diaphragm of this kind generally comprises a peripheral portion which is circularly continuous, and which forms a resilient washer of the Belleville washer type adapted to act on a pressure plate in order to clamp a friction disc between the latter and a reaction plate, and a central portion which is circularly fragmented to form radial segments by means of slots extending radially from a respective blind end near the said peripheral portion to an open end and leading in each case into a central aperture common to all the said slots. The central portion is adapted to control a deformation of the resilient washer formed by the said peripheral portion so as to effect the release of the pressure plate by the washer under the action of an axially movable clutch release bearing, which for that purpose acts on the free ends of the radial segments constituting the diaphragm.

At the present time the slots dividing the central portion of a diaphragm of this type are usually made by a cutting-out operation in a press, this cutting being effected with the aid of punches, each of which simultaneously forms the two edges of a slot.

The inevitable result is that circumferentially a slot formed in this manner has a width corresponding very accurately to the width of the punch producing it.

Having regard to the inherent characteristics of the blank undergoing punching, and particularly the high elastic limit of this blank, which is for example of the order of 80 kg/mm$^2$, its great hardness which is of the order of e.g. 200 to 250 HB, and its not negligible thickness of the order of e.g. 2 to 3 mm, the punches used for cutting a blank of this kind must necessarily be extremely robust to have an acceptable life, and must therefore necessarily have circumferentially a width greater than a critical threshold value, which is usually fixed at about 1.5 mm, unless they are made of expensive special steels and/or are used at reduced working speeds.

In practice this has the consequence that the slots dividing the central portion of a diaphragm into radial segments usually have at the present time a circumferential width at least equal to 1.5 mm.

However, these slots reduce the total supporting surface offered to the clutch release bearing by the central portion of the diaphragm on which the said release bearing has to act, this supporting surface being reduced to that presented to the said clutch release bearing by the radial segments separated by each pair of slots.

This inevitably results in correspondingly greater wear on the surfaces actually in contact between the clutch release bearing and the ends of the radial segments on which the release bearing acts.

In order to overcome this shortcoming it has already been proposed, particularly in French Pat. No. 1,398,920, to give a reduced width to the slots in question over at least part of their radial length including their open end, in order thereby to increase at this location — which corresponds to the support presented to the associated clutch release bearing — the supporting surface provided for the release bearing.

Nevertheless, for the reasons explained above this arrangement has hitherto encountered practical difficulties in its application, so that it has in fact never been possible to utilise it industrially.

The general object of the present invention is the provision of a process and an apparatus suitable for producing such slots of reduced width; it has as a further object the provision of the annular part — in practice a clutch diaphragm — obtained by the application of a process of this kind.

SUMMARY

According to the invention, over at least part of the radial length of a slot in an annular part of this kind, including the open end of the said slot, the two edges of the slot in question are formed in two separate operations, namely a first cutting operation in the course of which one of the edges is first formed, and then a second cutting operation in the course of which the other edge is formed.

The term "cutting" used herein means the operation of shearing which — as opposed to a punching operation leading to the formation of a slot whose edges are necessarily distant from one another to an extent corresponding to the width of the punch producing the slot — leads to the formation of a slit of zero width, that is to say a slit whose side edges are contiguous when the blank machined is in the flat state.

Because the two edges of a slot of this kind are each individually formed by a cutting operation of the kind described, the circumferential width of a slot of this kind is in practice independent of that of the punches utilised for effecting the corresponding cutting operations.

Consequently the circumferential width of a slot of this kind can be as small as desired, and in particular may easily be less than 0.5 mm, which for the entire diaphragm provided with slots of reduced width of this kind leads to a considerable increase of the support surface presented to the associated clutch release bearing in comparison with comparable diaphragms having slots obtained in the usual manner by punching; this increase may be substantially greater than 30%.

The wear to which a diaphragm produced in this manner is subject in operation is thereby accordingly reduced, to the benefit of the operational life of the diaphragm.

Furthermore, the reduction of circumferential width of the slots is achieved to the benefit of the circumferential width of the radial segments of the diaphragm (which are increased accordingly), so that after treatment these radial segments have improved rigidity, which is favourable to the performance of the clutch in which a diaphragm of this kind is used.

BRIEF DESCRIPTION OF THE DRAWINGS

FIG. 1 is a view in elevation of a clutch diaphragm which can be produced by application of the invention;

FIG. 2 is a view in axial section of this diaphragm, taken on line 2—2 in FIG. 1;

FIG. 3 is a diagrammatical view in section illustrating an initial punching operation applied to the blank machined for the purpose of producing a diaphragm of this kind;

FIG. 4 is a partial plan view of this blank after this punching operation;

FIG. 5 is a similar view to FIG. 3, illustrating the first cutting operation which is then applied according to the invention to the blank in question;

FIG. 6 is a partial plan view of this blank at the end of this first cutting operation;

FIG. 7 is a similar view to FIG. 5, illustrating the second cutting operation according to the invention;

FIG. 8 is a partial plan view of the blank obtained and of the corresponding scrap;

FIGS. 9 to 13, 14 to 18, 19 to 23, 24 to 28, 29 to 33, 34 to 38, and 39 to 43 are respectively similar to FIGS. 4 to 8, and relate to various modified embodiments, although FIGS. 13, 18, 23, 28, 33, 38, and 43 relate solely to the forms of scrap obtained and do not show the blank from which this scrap comes.

DESCRIPTION OF THE PREFERRED EMBODIMENTS

Figure 44A:
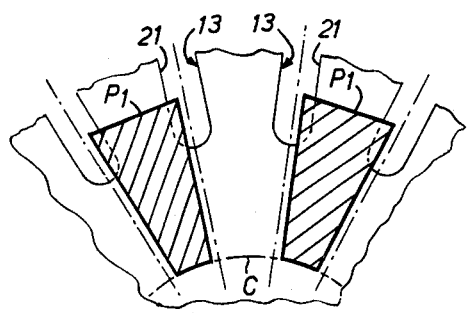
FIGS. 44A–44B, 45A–45B, 46A–46B, 47A–47B, 48A–48B, 49A–49B, 50A–50B, and 51A–51B repeat on a larger scale and in the form of a comparative table some details of FIGS. 4–6, 14–16, 9–11, 19–21, 24–26, 29–31, 34–36, and 39–41 respectively.

In order to improve the clarity of the Figures in this table, the median line of the slots to be formed in the blank being machined is shown in dot-dash lines.

FIGS. 1 and 2 show a clutch diaphragm of the type normally used for equipping motor vehicles.

The diaphragm is an annular part comprising a peripheral portion 10, which is circularly continuous and forms a resilient washer of the Belleville washer type, and a central portion 11 which is circularly divided into radial segments 12 by slots 13, each of the latter extending radially from a blind end 14, which is near the peripheral portion 10 and which is widened so as to form a passage, to an open end 15 which is of reduced circumferential width and by which it leads into a central aperture 16 common to all the slots 13.

In a manner known per se a diaphragm of this kind is formed from a steel blank which, after being cut out, is brought into the shape of a truncated cone, as can better be seen in FIG. 2, and is then subjected to any treatment capable of imparting to it the desired characteristics of elasticity and/or hardness.

These arrangements are well known per se and, since they do not form part of the present invention, will not be described in detail here.

As stated above, it is advantageous in diaphragms of this type to have available circumferentially, at the ends of the radial segments 12 against which the associated clutch release bearing is to bear, as large a supporting surface as possible.

It is for this reason that the open ends 15 of the slots 13, which two by two separate the said radial segments 12, must preferably have circumferentially the smallest possible width.

The present invention has precisely as its object a process and an apparatus permitting the practical production on an industrial scale, of such slots of reduced circumferential width, at least at their open end 15.

For convenience of description this circumferential width will be related to the circumference C constituting the periphery of the central aperture 16, and the same will apply to the circumferential width of the punches utilised in accordance with the invention to form these slots, as well as to the circumferential width of the radial segments which they delimit.

Likewise for convenience of description, the expression "circumferential pitch" of the blank being machined will be applied to the circumferential width of a radial segment to be formed in the said blank plus the circumferential width of the open end of reduced width of one of the slots which will flank a segment of this kind.

Finally, also for convenience of description, a distinction will be made herein below, for each slot 13, and more particularly for the open end 15 of such a slot, between an upstream radial edge 18 and a downstream radial edge 19, referring to the direction of circulation on the circumference C which is indicated by an arrow F in the drawing (FIG. 1), two edges of the same name being by convention called like edges, while two edges of different names being by convention called opposite edges.

Generally speaking, according to the invention, for at least part of the radial length of a slot 13, including the open end 15 of the latter, the two radial edges 18, 19 of a slot are formed in two separate operations, namely a first cutting operation in the course of which one of the edges in question is first formed, and then a second cutting operation in the course of which the other edge is formed.

In the embodiment illustrated in FIGS. 4 to 8 and 44A–44B, before the two cutting operations according to the invention, which will be described later on, the blank 20 being processed will be subjected to at least one punching operation in the course of which the two edges of a slot of this kind are formed simultaneously, in a manner known per se, over at least part of the length of the slots formed — including the widened blind end 14 of the latter.

This relates to the production of the normal portion 21 of a slot 13 from its widened end 14 onwards, this normal portion being distinguished by its relatively great width from the open end 15 of a slot of this kind, whose width is relatively slight, as described above.

In a manner known per se the normal portion 21 of a slot 13, together with the widened end 14 of the latter, is cut out with the aid of cutting punches D mounted for movement between supports A which, in conjunction with dies M, grip the blank 20 being processed at the location of the radial segments to be formed in the blank.

In the course of a punching operation of this kind each punch D simultaneously forms the two edges of the normal portion 21 of the slot which it forms in the blank 20 and, as illustrated in FIG. 3, the corresponding scrap 22 is detached from this blank.

In the course of the first cutting operation according to the invention which follows this punching operation, and in accordance with the embodiment illustrated in FIGS. 4, 5, and 44A, one of the edges of each of the slots which are to be formed — more precisely one of the edges 1, 18 of the open end of such a slot — is simultaneously cut with the aid of punches P1.

For greater clarity of description, the punches P1 in question are hatched in FIGS. 4 and 44A, and in FIG. 5 a part is shown in circumferential section developed flat.

As previously, these punches P1 are mounted for movement between supports A1 which, in association with dies M1, grip the blank 20 being processed, but for preference, and as illustrated, these punches P1 are associated with ejectors E1 mounted for movement between the dies M1.

Figure 44B:
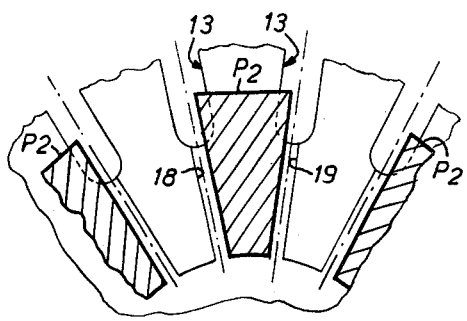
Figure 45A:
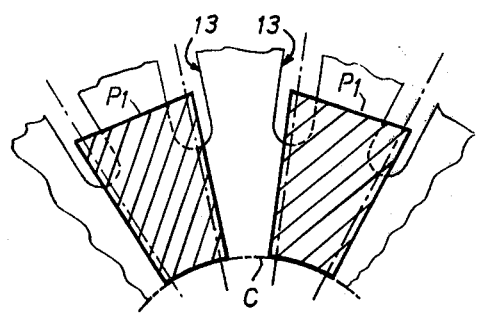
Figure 45B:
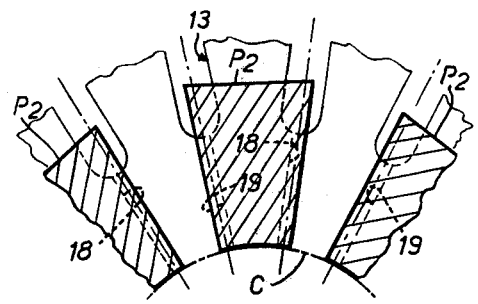

In the embodiment illustrated in FIGS. 4 to 8, and in FIGS. 44A–44B, the punches P1 with the aid of which the first operation of cutting according to the invention is carried out are identical; in practice each of them has a circumferential width which, as defined above, is equal to that of the radial segments to be formed in the blank 20 being machined.

In this case each punch P1 simultaneously produces the nearer opposite edges 18, 19 of the corresponding portions of two slots 13 adjoining one another which are to be formed.

It is to be noted that this first cutting operation entails no scrap.

Nevertheless, it is accompanied by flexion, transversely in relation to the plane of the blank 20 being machined, of the portion of this blank which is subjected to the action of the punches P1, as illustrated in FIG. 5.

The ejectors E1 associated with the punches P1 make it possible for that portion of the blank 20 being machined that was bent in the course of this cutting operation to be returned to its original position at the end of the first cutting operation described above, so that the blank is once again the flat state.

This blank is thus ready for the second cutting operation according to the invention.

In the embodiment illustrated in FIGS. 6 to 8 and 44B, this second cutting operation, like the preceding operation, is conducted with the aid of identical punches P2, with which, as previously, supports A2, dies M2, and ejectors E2 are associated.

In practice these punches P2 are in this case themselves identical with the punches P1, and the whole operation takes place as if a relative angular displacement — equal to the circumferential pitch of the radial segments to be formed in the blank 20 being machined, as defined above — were applied to this blank, in relation to the punches used in the course of the two cutting operations to which the blank is subjected, between the two respective cutting operations.

However this may be, in the course of the second cutting operation according to the invention, as previously in the embodiment illustrated in FIGS. 4 to 8 and 44A–44B, each punch P2 simultaneously forms the nearer opposite edges 18, 19 of the corresponding portions of the two neighbouring slots in question which are to be produced, as illustrated in FIGS. 6, 7, and 44B.

In the foregoing it was assumed that the blank 20 being machined had originally undergone only a punching operation leading to the formation of the normal portion 21 of these slots 13 and of the widened ends 14 of the latter.

The central portion of this blank was therefore not cut out during this punching operation.

However, in the embodiment illustrated in FIGS. 4 to 8 and 44A–44B the two cutting operations lead in themselves to the cutting-out of the central portion of the blank 20 machined, so that at the end of the second of these cutting operations there are separately formed, on the one hand, the blank 20 being machined which comprises the cut blank desired for the diaphragm to be formed from the latter, and on the other hand a single scrap 25 which is star-shaped and comprises in a single piece the circular central portion 26 of the blank, which portion has thus been cut out, and the radial spoke-like portions 27 of the blank corresponding to the formation in the latter, by cutting, of the open ends 15 of the slots 13; it is then sufficient for this scrap to be ejected in the usual manner after the ejectors E2 have returned the machined blank to its original flat shape.

Thus, in this embodiment the spoke-shaped scraps 27 are advantageously all joined to one another by the central scrap 26 corresponding to the central cut-out portion of the blank machined, whereby their ejection is facilitated.

However, it is obvious that it would have been possible for the central portion to be cut out during the punching of the normal portion of the slots 13, in which case the spoke-shaped scraps 27 would then be individually separate from one another.

In the foregoing the punches P1 and P2 used had a circumferential width equal to that of the segments to be formed in the blank machined, and it is therefore the nearer opposite edges of the two neighbouring slots concerned that are simultaneously formed by each of these punches during the corresponding cutting operation.

As an alternative, which is illustrated in FIGS. 14 to 18 and 45A and 45B, the punches P1, P2 used have a circumferential width equal to the circumferential width of the radial segments to be formed in the blank machined plus twice the circumferential width of the open end of the corresponding slots, and it is therefore the more distant opposite edges of the corresponding portions of the two neighbouring slots concerned which are simultaneously formed by each of these punches during the corresponding cutting operation, the relative angular offsetting of the punches P1, P2 from one cutting operation to the next being once again equal to the circumferential pitch of the blank machined, as previously.

This has the consequence in this case that, even if the blank machined has not been originally cut out centrally, the spoke-shaped scraps 27 corresponding to the open ends of the slots 18 are detached from the scrap 26 corresponding to the central cut-out portion of this blank, FIG. 18.

In the embodiment illustrated in FIGS. 9 to 13 and 46A–46B the punches P1 and P2 used in the course of the two cutting operations according to the invention are identical, as previously, but in this case they have a circumferential width equal to that of the segments to be formed in the blank 20 machined plus the circumferential width of the corresponding portion of a slot which is to be formed.

Figure 46A:
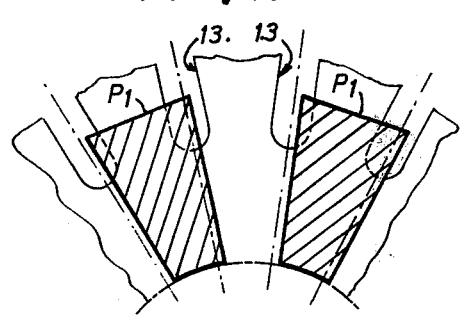
Figure 46B:
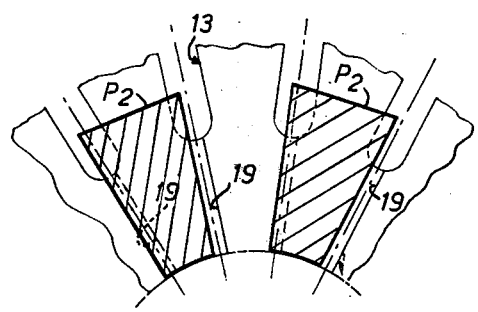

However, as illustrated in FIGS. 9, 10, and 46A, the punches P1, for example, are disposed in such a manner that each of them will simultaneously form like edges 19 of the corresponding portions of the two neighbouring slots in question which are to be formed, and, as illustrated in FIGS. 11, 12, and 46B, during the second cutting operation the punches P2 used are themselves so disposed that each of them will simultaneously form like edges 18 of the corresponding portions of the two neighbouring slots in question which are to be formed.

In other words, between each two of these cutting operations what happens is as if a relative angular displacement equal to the circumferential width of the open end of a slot were applied to the blank machined, in relation to the punches used during these cutting operations.

However, in this case, and as in the case of the embodiment illustrated in FIGS. 14 to 18 and 45A–45B, the spoke-shaped scraps 27 corresponding to the open ends of the slots to be formed are individually separate from one another, whether the central portion of the blank 20 had been removed previously to the cutting operations or whether it is not removed until the end of any one of these cutting operations.

In the embodiment illustrated in FIGS. 19 to 23 and 47A-47B, the two cutting operations are effected with punches which differ from one of these operations to the other.

Figure 47A:
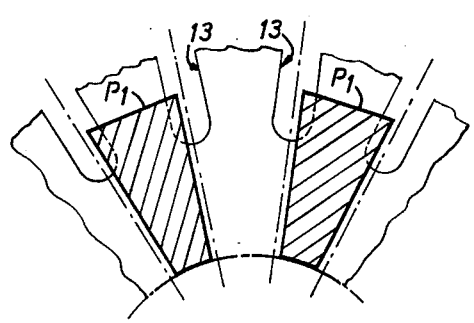

For example, and as illustrated, the punches P1 used in the first cutting operation, which are all identical to one another, have a circumferential width equal to that of the radial segments which are to be formed in the blank 20 being machined, so that each of them simultaneously forms the nearer opposite edges of the corresponding portions of the two neighbouring slots concerned which are to be formed, as shown in FIG. 47A.

Figure 47B:
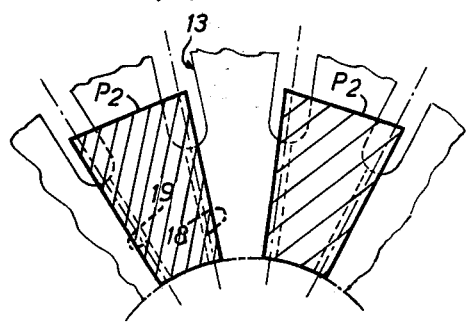

Conjointly, the punches P2 used in the second cutting operation, which are likewise identical to one another, have in each case a circumferential width equal to that of the radial segments to be formed in the blank 20 being machined plus twice the circumferential width of the open end of the corresponding slots, so that each of them simultaneously forms the more distant opposite edges of the corresponding portions of the two respective slots which are to be formed, as shown in FIG. 47B.

In other words, the circumferential width at any point of the radial length of a punch P2 exceeds in this case the circumferential width at the corresponding point of the radial length of a punch P1 by a value equal to twice the circumferential width of the open end of the slots which are to be formed.

In this case it is therefore the first cutting operation that is effected with the aid of the narrower punches.

The spoke-shaped scraps 27 obtained are then individually separate from one another, whether the central portion of the blank 20 being machined had been cut out before the two cutting operations or whether it is cut out only at the end of any one of these operations.

The embodiment illustrated in FIGS. 24 to 28 and 48A-48B is generally similar to that illustrated in FIGS. 19 to 23, but the punches P1 used in the first cutting operation, which are identical to one another, are wider than the punches P2 used in the second cutting operation, which are likewise identical to one another.

Figure 48A:
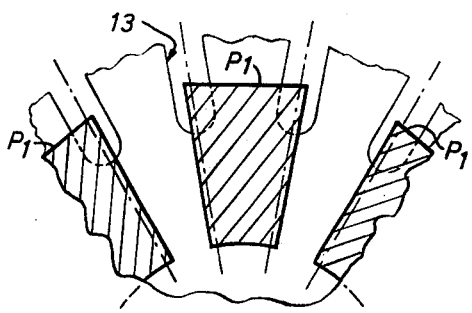
Figure 48B:
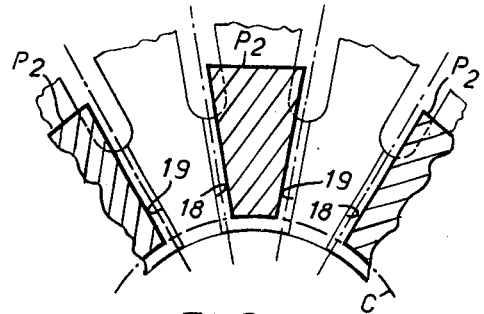
Figure 49A:
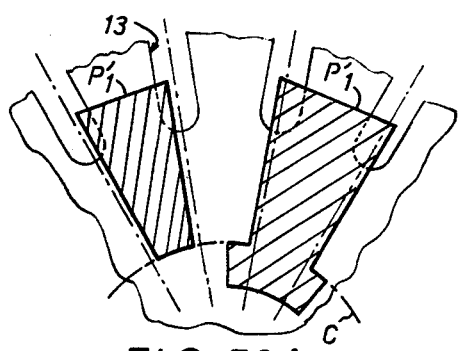
Figure 49B:
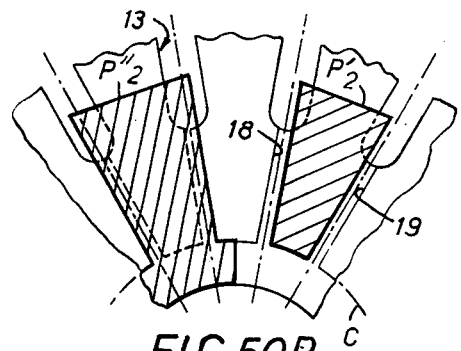

In this case the punches P1 have a circumferential width equal to that of the segments to be formed plus twice the circumferential width of the open end of a slot (FIG. 48A), while the punches P2 have a circumferential width equal to that of the segments to be formed (FIG. 48B).

If, as previously, the punches P1, P2 have the same radial length, the spoke-shaped scraps obtained at the end of a second cutting operation are individually separate from one another.

However, as illustrated in FIGS. 24, 26, 48A-48B, the punches P2 used in the second cutting operation, which are the narrower punches, preferably have a radial length less than that of the punches P1 used in the first cutting operation, so that (FIG. 28) the spoke-shaped scraps 27 obtained are connected in V-shaped pairs by a central bar 30 independently of the associated central scrap 26, whether the latter is formed before the cutting operations or at the end of any one of these operations.

The ejection of the spoke-shaped scraps 27 is thereby facilitated.

In order to facilitate this ejection still further it is advantageous for the central bar 30 which thus connects pairs of spoke-shaped scraps 27 to be thickened, that is to say for its transverse width to be as great as possible.

To this end, according to the embodiment illustrated in FIGS. 29 to 33 and 49A-49B, each of the cutting operations is effected with the aid of punches of two different types.

For example, and as illustrated, during the first cutting operation punches P'1 of a second type are used in alternation with punches P"1 of a second type.

The narrower punches P'1 have a circumferential width equal to that of the radial segments to be formed in the blank machined, so that each of them simultaneously forms the nearer opposite edges of the corresponding portions of the two respective neighbouring slots which are to be formed.

The wider punches P"1 have at any point of their radial length a circumferential width which exceeds the circumferential width at the corresponding point of the radial length of the punch P'1 by a value equal to twice the circumferential width of the open end of a slot to be formed, and beyond their circumferential edge remote from the peripheral portion of the flange 20 machined each of them has a radial extension 32 which projects circumferentially in both directions.

In the second cutting operation punches P'2 and P"2 are used which are respectively identical to the punches P'1 and P"1 used in the first cutting operation, with a relative angular displacement of the blank 20 machined, in relation to these punches, equal to twice the circumferential pitch of the blank machined, as defined above, between two of these cutting operations.

The circumferential extent of the radial projections 32 of the punches P"1 and P"2 is so established that they conjointly establish the continuity of a crown around the central aperture of the blank, and this crown is divided by these punches into thickened scraps 30 which connect pairs of spoke-shaped scraps 27 and also correspond to the open ends of the slots to be formed (FIG. 33).

In the modified embodiment illustrated in FIGS. 34 to 38 and 50A-50B the first cutting operation is effected with the aid of punches P1 all of which are identical and each of which has a circumferential width equal to that of the segments to be formed.

Conjointly, the second cutting operation is effected with the aid of punches P2 all of which are identical and each of which has a circumferential width which at any point of their radial length is greater than the circumferential width at the corresponding point of the radial length of the punches P1 by a value equal to twice the circumferential width of the open end of a slot which is to be formed.

In addition, the punches P2, which in this case are the larger, are each provided beyond their circumferential edge remote from the peripheral portion of the blank 20 being machined with a radial extension 32 of the type described with reference to the embodiment illustrated in FIGS. 29 to 30, that is to say a radial projection extending circumferentially in both directions.

Figure 50A:
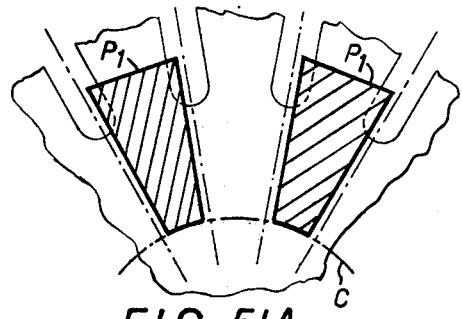
Figure 50B:
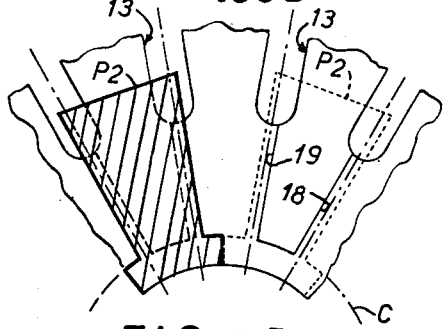

For the sake of convenience it is then preferable for this second cutting operation to be effected in two stages, namely a first stage during which only half of the punches P2 are used (FIGS. 36, 37, and 50B), these punches being situated in pairs at a circumferential distance from one another equal to four times the circumferential pitch of the blank 20 being machined, and a second stage during which the other half of the punches P2 is used, these punches P2 being similarly situated in pairs at a circumferential distance from one another equal to four times the pitch in question, with a relative angular displacement of the said punches equal to twice this pitch from one of these stages to the next, as indicated in dotted lines in FIGS. 36 and 50B.

As previously in the case of the embodiment illustrated in FIGS. 29 to 30, the spoke-shaped scraps 27 are then connected in pairs by a thickened median bar 30 of relatively considerable size (FIG. 38).

Figure 51A:
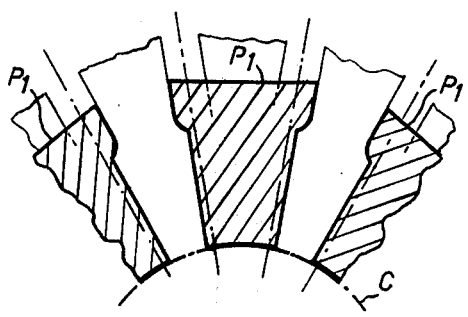
Figure 51B:
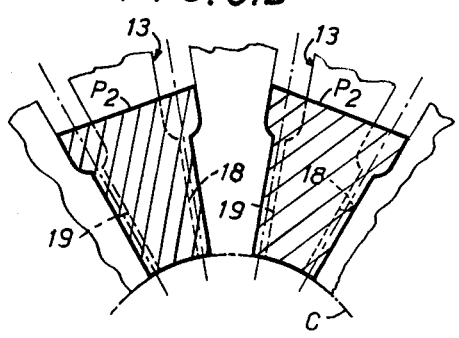

In the embodiment illustrated in FIGS. 39 to 43 and 51A-51B the punches P1 used in the first cutting operation, all of which are identical to one another, all have a circumferential width equal to that of the radial segments to be formed plus twice the circumferential width of the corresponding portion, that is to say of the open end, of the two corresponding neighbouring slots which are to be formed, so that each of them simultaneously forms the more distant opposite edges of the two slots in question, but in addition, at each of the circumferential ends of their circumferential edge nearer the peripheral portion of the blank 20 being machined, each of them has a circumferential thickened portion 40 (FIGS. 39 and 51A).

The punches P2 used in the second cutting operation (FIGS. 4 and 51B) are identical to one another and are identical to the punches P1 used in the first cutting operation, with a relative angular displacement of the blank being machined, in relation to the punches, from one of these operations to the next, this displacement being equal to the circumferential pitch of the blank being machined, as previously defined.

This has the consequence that the two cutting operations according to the invention participate in the formation of the end of the normal portions 21 of the slots which are to be formed in the blank being machined, so that the spoke-shaped scraps 27 obtained at the end of the different operations applied to this blank each have a thickened portion 42 (FIG. 43) corresponding to the end of the normal portions in question, which facilitates their ejection.

The present invention is obviously not limited to the embodiments described and illustrated, but includes any modified embodiment and/or any combination of the said embodiments.

In addition, the open end of reduced width of the slots to be formed in the blank being machined may be of any radial length.

Nevertheless, in practice it is advantageous for this radial length to be reduced to the portion of the diaphragm with which the associated clutch release bearing has actually to co-operate, so that in each cutting operation the flexion of the portion of the blank being machined which is subjected to the action of the punches used in a cutting operation of this kind will be facilitated.

Furthermore, the usual practical forms of construction applied to work of this kind may be applied, and for example the series production of the diaphragms in question may be affected with the aid of transfer machines or of follow-on tools, or else with the aid of working stations where the blanks being machined are successively presented individually as the various working operations applied to them proceed.

In all cases the two cutting operations characteristic of the process of the invention can in practice be effected with the aid of punches each of which has a width, taken circumferentially, which is greater at any point of their length, taken radially, than the width of the corresponding portion of the slots which are to be formed.

I claim:

1. A process for producing an annular part such as a clutch diaphragm from a blank wherein the part comprises a peripheral portion which is circularly continuous and forms a resilient washer of the Belleville washer type, and a central portion circularly fragmented into radial segments by slots each of which extends radially from a blind end adjacent the said peripheral portion to an open end by which it leads into a central aperture common to all the said slots, wherein over at least part of the length of a slot, including the open end of the latter, the two edges of the slot are formed in two separate operations, these being a first cutting operation in the course of which one of the edges is formed, and a second cutting operation in the course of which the other edge is formed.

2. A process as claimed in claim 1, wherein the two cutting operations are carried out with the aid of punches each of which has a width, taken circumferentially, which at any point of their length, taken radially, is greater than the width of the corresponding portion of the slot which is to be formed.

3. A process as claimed in claim 1, wherein at least one of the cutting operations is effected with the aid of punches all of which are identical.

4. A process as claimed in claim 3, wherein the two cutting operations are effected with the aid of punches all of which are identical.

5. A process as claimed in claim 4, wherein between the two cutting operations, a relative angular displacement of one circumferential pitch is applied to the blank in relation to the punches used in the course of the said cutting operations.

6. A process as claimed in claim 4, wherein between the two cutting operations, a relative angular displacement equal to the circumferential width of the corresponding portion of a slot to be formed is applied to the blank in relation to the punches used in the course of the cutting operations.

7. A process as claimed in claim 1, wherein for at least one of the cutting operations, each punch used first simultaneously produces the opposite edges of the corresponding portions of two neighbouring slots.

8. A process as claimed in claim 7, wherein for the said cutting operation, each punch used simultaneously forms the nearer opposite edges of the corresponding portions of two neighbouring slots.

9. A process as claimed in claim 8, wherein the operations applied to the blank result in a single one-piece scrap in the form of a star comprising a central portion and radial spokes.

10. A process as claimed in claim 7, wherein each punch used simultaneously produces the more distant opposite edges of two neighbouring slots.

11. A process as claimed in claim 10, wherein each punch has a laterally enlarged portion at each of the circumferential ends of its circumferential edge nearer the peripheral portion of the blank.

12. A process as claimed in claim 11, wherein the operations applied to the blank result in the formation of a plurality of spoke-shaped scraps, each of which has an enlarged portion at one of its ends.

13. A process as claimed in claim 3, wherein for at least one of the cutting operations, each punch used simultaneously produces like edges of the corresponding portions of two neighbouring slots.

14. A process as claimed in claim 13, wherein the two cutting operations are effected with the aid of punches all of which are identical, and a relative angular displacement equal to the circumferential width of the corresponding portion of a slot is applied to the blank in relation to the said punches, between the said operations.

15. A process as claimed in claim 3, wherein the two cutting operations are carried out with punches which are different in one operation from those used in the other operation.

16. A process as claimed in claim 15, wherein the circumferential width at any point of the radial length of a punch in one of the cutting operations is greater than the circumferential width at the corresponding point of the radial length of a punch in the other of the said cutting operations, the difference in width being equal to twice the circumferential width of the corresponding portion of a slot.

17. A process as claimed in claim 16, wherein the first cutting operation is effected with the aid of the narrower punches.

18. A process as claimed in claim 16, wherein the first cutting operation is effected with the aid of the wider punches.

19. A process as claimed in claim 10, characterised in that the operations applied to the blank machined lead to the formation of a plurality of spoke-shaped scraps.

20. A process as claimed in claim 17, wherein at the open end of the slots to be formed, the narrower punches have a radial length less than that of the wider punches.

21. A process as claimed in claim 19, wherein the operations applied to the blank result in the formation of a plurality of spoke-shaped scraps connected in V-shaped pairs by a median bar.

22. A process as claimed in claim 17, wherein for the cutting operation carried out with the aid of the wider punches, use is made of punches which beyond their circumferential edge at the greater distance from the peripheral portion of the blank have a radial extension projecting circumferentially in both directions.

23. A process as claimed in claim 22, wherein the second operation is carried out in two stages, in which the punches used are, two by two, at a circumferential distance from one another equal to four times the circumferential pitch of the blank, and a relative angular displacement of the said blank in relation to the said punches is applied which is equal to twice the said pitch between the two aforesaid stages.

24. A process as claimed in claim 1, wherein at least any one of the cutting operations is carried out with the aid of punches of different radial extent.

25. A process as claimed in claim 14, wherein the said cutting operation is carried out with the aid of narrower punches alternating with wider punches, the circumferential width at any point along the radial length of the wider punches being greater than the circumferential width at the corresponding point of the radial length of the narrower punches, the difference in width being equal to twice the circumferential width of the corresponding portion of a slot to be formed, and each of the said wider punches having, beyond their circumferential edge more distant from the peripheral portion of the blank, a radial extension projecting circumferentially in both directions.

26. A process as claimed in claim 25, wherein the two cutting operations are effected with the aid of identical punches, and relative angular displacement of the blank in relation to the said punches is applied by an amount equal to twice the circumferential pitch of the said blank, between the two operations in question.

27. A process as claimed in claim 24, wherein, in the course of the same cutting operation certain of the punches simultaneously form the nearer opposite edges of the corresponding portions of the two neighbouring slots which are to be produced, while the others simultaneously produce the more distant opposite edges of the corresponding portions of the two neighbouring slots.

28. A process as claimed in claim 22, wherein the operations applied to the blank result in the formation of a plurality of spoke-shaped scraps connected in V-shaped pairs by a thickened median bar.

29. A process as claimed in claim 1, wherein, in at least one of the cutting operations, one of the edges of each of the slots to be formed is produced simultaneously.

30. A process as claimed in claim 1, wherein prior to the two cutting operations, there is applied to the blank at least one punching operation in the course of which over at least part of the length of at least one of the slots to be formed, including the blind end of the latter, the two edges of the slot being formed simultaneously.

31. A process as claimed in claim 1, wherein prior to the two cutting operations, the central portion of the blank is cut out.

32. A process as claimed in claim 1, wherein the cutting-out of the central portion of the blank is effected after any one of the cutting operations has terminated.

33. A process as claimed in claim 1, wherein each cutting operation is accompanied by the deformation of a portion of the blank transversely in relation to the plane of the blank, and the blank flattened at the end of a cutting operation.

34. A process as claimed in claim 33, wherein to restore the flatness of the blank at the end of each cutting operation, an ejector is associated with each punch used in the cutting operation.

35. An apparatus for producing an annular part such as a clutch diaphragm, from a blank, wherein the part comprises a circularly continuous peripheral portion forming a resilient washer of the Belleville washer type, and a central portion circularly fragmented into radial segments by slots each of which extends radially from a blind end which is adjacent the said peripheral portion, to an open end by which it leads into a central aperture common to all the said slots, wherein the apparatus comprises at two separate stations, cutting punches of which at least some have a length, taken circumferentially, which at any point of their length, taken radially, is greater than the width of the corresponding portion of the slots to be formed, so that each of these punches is individually capable of producing only one of the edges of a slot of this kind.

* * * * *